United States Patent
Kako

(10) Patent No.: US 11,491,684 B2
(45) Date of Patent: Nov. 8, 2022

(54) DEVICE AND METHOD FOR POSITIONING MATERIAL PLIES, IN PARTICULAR FIBERS, ON A FORMING TOOL

(71) Applicant: Airbus Operations GmbH, Hamburg (DE)

(72) Inventor: Jan-Christoph Kako, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 16/701,376

(22) Filed: Dec. 3, 2019

(65) Prior Publication Data
US 2020/0206979 A1     Jul. 2, 2020

(30) Foreign Application Priority Data
Dec. 28, 2018 (DE) .......................... 102018133683.7

(51) Int. Cl.
*B29B 11/16*     (2006.01)
*B29C 70/54*     (2006.01)
*B29L 31/30*     (2006.01)

(52) U.S. Cl.
CPC ............ *B29B 11/16* (2013.01); *B29C 70/543* (2013.01); *B29L 2031/3076* (2013.01)

(58) Field of Classification Search
CPC .................. B29B 11/16; B29C 70/543; B29L 2031/3076
See application file for complete search history.

(56) References Cited

U.S. PATENT DOCUMENTS

| | | | |
|---|---|---|---|
| 4,997,510 A * | 3/1991 | Shinno | .................. B29C 70/388 |
| | | | 156/361 |
| 5,806,387 A | 9/1998 | Jander | |
| 9,399,325 B2 | 7/2016 | Barlag et al. | |
| (Continued) | | | |

FOREIGN PATENT DOCUMENTS

| | | |
|---|---|---|
| DE | 102012203388 A1 | 9/2013 |
| DE | 102012203395 A1 | 9/2013 |
| (Continued) | | |

OTHER PUBLICATIONS

German Search Report; priority document.
Ufer, "Großserienfähige Preformtechnologie für komplexe Composite-Bauteile," Munchen, Germany, Jun. 4, 2014.

*Primary Examiner* — Jeffrey M Wollschlager
*Assistant Examiner* — Shibin Liang
(74) *Attorney, Agent, or Firm* — Greer, Burns & Crain, Ltd.

(57) ABSTRACT

For the exact lateral continuous positioning of material plies on a forming tool, a positioning device is provided to position a material ply on a forming tool during a production of a fiber composite component, comprising a positioning unit for positioning the positioning device in relation to a surface of the forming tool, a movement unit for moving the positioning device along a predetermined movement route along the forming tool, a route position detection unit for detecting the current route position of the positioning device on the movement route, and a material ply positioning unit for positioning the material ply in a direction transverse to the movement direction in dependence on the current route position detected by the route position detection unit.

10 Claims, 3 Drawing Sheets

(56) References Cited

U.S. PATENT DOCUMENTS

| | | |
|---|---|---|
| 9,757,904 B2 | 9/2017 | Ufer et al. |
| 2009/0205767 A1 | 8/2009 | Lauder et al. |
| 2010/0196678 A1* | 8/2010 | Vermeulen ............ B44C 5/0446 |
| | | 428/195.1 |
| 2014/0193618 A1* | 7/2014 | Nelson .................... B32B 41/00 |
| | | 428/209 |
| 2014/0202611 A1 | 7/2014 | Schaaf et al. |
| 2017/0026694 A1 | 1/2017 | Bai et al. |

FOREIGN PATENT DOCUMENTS

| | | |
|---|---|---|
| DE | 102014201099 A1 | 7/2015 |
| DE | 102015102467 A1 | 8/2016 |
| DE | 102015201551 A1 | 8/2016 |
| DE | 102016104926 A1 | 9/2017 |
| WO | 9747448 A1 | 12/1997 |
| WO | 2010037612 A1 | 4/2010 |

* cited by examiner

DEVICE AND METHOD FOR POSITIONING MATERIAL PLIES, IN PARTICULAR FIBERS, ON A FORMING TOOL

CROSS-REFERENCES TO RELATED APPLICATIONS

This application claims the benefit of the German patent application No. 102018133683.7 filed on Dec. 28, 2018, the entire disclosures of which are incorporated herein by way of reference.

FIELD OF THE INVENTION

The invention relates to a positioning device for positioning a material ply on a forming tool during a production of a fiber composite component. Furthermore, the invention relates to a molding arrangement for use during the production of a fiber composite component, in particular for producing a preform for a reinforcing element formed from fiber composite material for a component, in particular of a vehicle, more particularly of an air vehicle. Furthermore, the invention relates to a positioning method for positioning a material ply on a forming tool for producing a preform for a fiber composite component. Furthermore, the invention relates to a production method for producing a preform for a fiber composite component using such a positioning method and a computer program product having control instructions for carrying out such a positioning method.

BACKGROUND OF THE INVENTION

The invention is applicable, in particular, in the production of fiber composite components, which extend in a longitudinal direction and the shape of which changes in dependence on the position in the longitudinal direction. In particular, the invention is applicable to the production of reinforcing elements such as stringers or frames, which have a variable width, thickness, or contour in the longitudinal direction.

One preferred area of application of the invention is the production of composite material reinforcing elements. The invention relates in particular to positioning of fibers. More generally, the invention relates to the positioning of material plies, for example, fiber plies or laminates, on a forming tool. In particular, the invention is suitable for the production of flat laminates (in particular, for stringers or frames) on forming tools before the molding. One possible specific application is in the production of control surfaces of air vehicles made of fiber composite material, in particular in the production of reinforcing elements, more particularly reinforcing profiles made of fiber composite materials for such control surfaces. Examples of such control surfaces are control flaps or landing flaps of aircraft, for example, the aircraft A320. In particular, in the case of a design close to the final contour of stringer web cavities, a very narrow tolerance is specified in this case in the positioning.

In order that such a control surface can reliably absorb high forces, reinforcing elements for such control surfaces are accordingly provided with force-absorbing structures. In particular, reinforcing elements in the form of stringers or frames are provided, which are formed, for example, T-shaped or U-shaped. If the reinforcing elements are produced from fiber composite materials, fibers are then to be exactly positioned in accordance with the forces to be absorbed. For this purpose, laminates, which comprise fibers in particular, are laid on forming tools to form a preform, from which the reinforcing element is subsequently formed—e.g., by curing or infiltrating and curing in an autoclave. For example, a U-profile shape is formed by application of laminates to a corresponding forming tool, which is formed in the shape of an oblong trapezoid.

Thin and long laminates for U-profile-shaped stringers are to cover, for example, the entire base area of the forming tool. To enable force-dependent fiber profiles and profiles of laminates in the preform, the laminates—this is an example of a material ply—are to be positioned correctly on the forming tool in this case. Since the laminates cover the entire base, stops cannot be used on the forming tool, at which the lateral edges of the laminate could be applied for lateral positioning.

According to one possible hitherto used procedure, either holes are used in the laminates to pin the laminates at the exact position on positioning pins or the like, or manual measurement is performed with a high level of effort, in particular if the laminate has to be matched exactly with the stringer pocket geometry because of quality requirements or if a production close to the final contour is desired. A manual measurement is also made more difficult in that in such a stringer geometry, a planar reference surface of the panels to be provided therewith is not provided because of the curved shape.

On the other hand, slipping of the materials in relation to one another is to be avoided during the fixing of the laminates. This is avoided in the presently used methods by the positioning pins or by adding pressure-sensitive tapes at regions where the stringer is interrupted (so that the width of the laminate matches with the width of the forming tool). Recently, magnets have also been used for fixing the laminates on the forming tool.

SUMMARY OF THE INVENTION

The invention is based on an object of providing a device and an arrangement and also a method, using which a more area-extended fixation and a continuous fastening at the correct position is enabled in consideration of the still slight transverse rigidity of the uncured laminates even in the case of dimensions changing over a direction of the forming tool.

The invention provides, according to a first aspect thereof, a positioning device for positioning a material ply on a forming tool during a production of a fiber composite component, comprising:

a positioning unit for positioning the positioning device in relation to a surface of the forming tool, a movement unit for moving the positioning device along a predetermined movement route along the forming tool, a route position detection unit for detecting the current route position of the positioning device on the movement route, and a material ply positioning unit for positioning the material ply in a direction transverse to the movement direction in dependence on the current route position detected by the route position detection unit.

One preferred design of the positioning device is characterized by a carriage movable over the forming tool. In one embodiment, the carriage can slide over the forming tool or—for example, suspended on a guide unit attached on a table or the like, can be moved at a small spacing above the forming tool. In particular, the carriage is formed having a chassis and thus as a wagon, which can travel on a forming surface of the forming tool.

The positioning device is preferably designed to move between a material ply which has previously been laid on the forming tool positioned in its longitudinal direction in relation to the forming tool, and the forming tool in the longitudinal direction of the forming tool and to laterally position the material ply at the same time.

It is preferable for the carriage to comprise at least one ramp on a front and/or rear end with respect to the movement direction to guide the material ply over the carriage or from the upper side of the carriage to the forming tool. A front ramp is preferably provided at a front end of the carriage. A rear ramp is preferably provided at a rear end of the carriage.

Using a front ramp, the carriage can travel under the material ply, which has previously been laid on the forming tool positioned in its longitudinal location—for example, on a longitudinal stop of the forming tool. The material ply is then guided over the upper side of the carriage. The lateral location of the material ply is positioned in accordance with the current position using the material ply positioning unit at the same time. The material ply can subsequently be guided on the rear ramp to the forming tool and deposited there, in particular, pressed on.

It is preferable for the positioning unit to be designed to enclose a convex forming surface of the forming tool.

For example, the forming tool is an oblong profiled element, which can be accommodated between the positioning unit, so that positioning is enabled in relation to a reference plane of the profile element, for example, by contact on the lateral surfaces of the profile element.

It is preferable for the positioning unit to comprise a centering unit for centering the positioning device on an oblong forming tool. For example, centering of the positioning device at the center of the forming tool is achieved by contact at lateral surfaces of the forming tool, so that the positioning device can move centrally on the forming tool along its longitudinal direction.

It is preferable for the positioning unit to comprise at least one first positioning arm for detecting a first side of the forming tool and at least one second positioning arm for detecting a second side of the forming tool opposite to the first side. The positioning arms can be movable, for example, and can be controlled in such a way that the positioning device can be aligned on a reference plane—this can be, for example, the center longitudinal plane or a parallel plane thereto—by contact of the positioning arms on the lateral surfaces of the forming tool.

It is preferable for the positioning unit to comprise positioning arms which are movement-coupled with one another for detecting the forming tool. The first and the second positioning arm are preferably movement-coupled with one another, to thus achieve, for example, centering of the positioning device on the oblong forming tool. Using differently designed positioning arms, an alignment on a longitudinal plane other than the center plane may also be achieved, for example, by movement coupling. By way of the movement of the positioning arms, they can be adapted to different widths of the forming tool along its longitudinal extension. An alignment of the positioning device on conical or wedge-shaped tapering forming tools can thus also be achieved.

It is preferable for the positioning device to comprise multiple positioning arms spaced apart in the movement direction. For example, two first positioning arms are provided on the first side of the positioning device, which can engage on different points on the lateral surface of the forming tool in the longitudinal direction of the movement route. In this way, multiple regions of the positioning device spaced apart in the longitudinal direction are positioned, so that the alignment of the positioning device is settable.

It is preferable for the positioning unit to comprise multiple contact elements for contacting different points on an outer surface of the forming tool. The contact elements can be provided, for example, on the above-mentioned positioning arms. The contact elements can comprise in particular sliding shoes or more preferably rollers.

Multiple contact elements in the vertical direction or one contact element extending in the vertical direction are particularly preferably also provided. An alignment of the positioning device along an upwardly oriented line at a lateral surface of the forming element can thus also be performed. For example, each positioning arm comprises multiple adjacent rollers in the vertical direction.

The contact elements are preferably movable in a direction transverse to the movement direction. This is achieved, for example, by arranging the contact elements on positioning arms. However, the positioning arms are only a presently preferred exemplary embodiment for the movement option of the contact elements. The carriage could, for example, also have an L-shape or a U-shape on the bottom, which is wider than the forming tool, to accommodate the forming tool therein, wherein the contact elements can extend out of legs of the L-shape or U-shape on stamps or the like inward onto the lateral surface of the forming tool.

It is preferable for the positioning unit to comprise a spring-loaded or elastically pre-tensioned parallelogram guide. For example, the positioning arms are coupled to a parallelogram guide. In particular, the contact elements and/or the positioning arms are tensioned by a spring or similar force accumulator toward the forming tool in order to clamp the forming tool between them and thus achieve centering and/or alignment of the positioning device on the forming tool.

It is preferable for the positioning unit to comprise multiple clamping rollers for clamping onto the forming tool. The positioning device may, in particular, be moved centered on the forming tool by way of clamping rollers which accommodate the forming tool between them.

It is preferable for the positioning unit to comprise a positioning controller for computer-based positioning of the positioning device. In particular in the case of complicated movement routes, for example, in the case of complicated profiles of the forming tool, the positioning device may be positioned exactly in relation to the forming tool using a positioning controller, which is designed, for example, as an NC-controller. This may be implemented, for example, via positioning of the contact elements and/or the positioning arms or via an external guide, for example, on guide rails or the like on a processing table, and corresponding actuators, for example, positioning motors.

It is preferable for the movement unit to comprise at least one drive roller or one drive wheel. For example, a drive wheel or a drive roller can be provided on the lower side of the carriage, which rolls on an upper side of the forming tool and is driven to drive the movement.

It is preferable for the movement unit to comprise at least one movement drive motor. This can be provided, for example, on the carriage for driving the drive roller.

It is preferable for the movement unit to comprise at least one stepping motor or servomotor having position detection. The positioning device may thus be moved over the forming tool along the movement route—for example, along the longitudinal center plane of the forming tool—wherein simultaneously an item of information about position and speed is achievable. In particular, the movement may be controlled or regulated well.

It is preferable for the movement unit to comprise at least one movement controller. The movement controller can control the movement on the basis of predetermined data, for example, on the basis of specifications of a central process controller. In particular, the movement controller can be designed as an NC-controller.

It is preferable for the route position detection unit to comprise an odometer or a distance odometer.

It is preferable for the route position detection unit to comprise an optical length measuring device or position detection device.

It is preferable for the route position detection unit to comprise a rotational angle encoder or rotational speed encoder on a roller or wheel rolling on the movement route. The roller or the wheel is preferably freely rotating to thus detect the exact length of the covered route of the positioning device and thus the exact current position on the movement route.

It is preferable for the route position detection unit to comprise a rotational angle encoder or rotational speed encoder on a movement drive motor or a gearing element connected thereto for joint rotation. This information is preferably used in addition to another type of position detection.

It is preferable for the route position detection unit to be connected to a movement controller or a signal encoder for activating a movement drive motor to obtain an item of information about the route position.

It is preferable for the route position detection unit to comprise a relative value encoder and a reference point. For example, a distance odometer or odometer or an incremental encoder or absolute rotational angle encoder can be provided on a positioning wheel, so that the current position on the movement route is detected in dependence on a route mark.

It is preferable for the route position detection unit to comprise an absolute value encoder. For example, a device could be provided for optical distance measurement to reference points, so that the position of the positioning device is absolutely detectable.

It is preferable for the material ply positioning unit to comprise at least one material ply engaging unit for engaging on the material ply. For example, the material ply can be engaged using a gripper or using a guide and laterally positioned.

It is preferable for the material ply positioning unit to comprise at least one first edge engaging unit for engaging on a first lateral edge of the material ply and/or a second edge engaging unit for engaging on a second lateral edge of the material ply opposite to the first lateral edge. In particular, at least one material ply engaging unit can be formed by a stop, which engages on a lateral edge of the material ply and can thus laterally displace the material ply. This can preferably take place on opposing lateral edges, so that the material ply can be pushed from both sides by pressure on the lateral edge from a displaced location into an exact location.

It is preferable for the material ply positioning unit to comprise at least one actuator for laterally moving at least one engaging unit of the material ply positioning unit into a lateral position dependent on the current route position. The lateral position of the engaging unit can be set to a predetermined route-dependent position by the actuator. The positioning device can thus be set to a different width of a non-rectangular laminate or the like resulting, for example, along the longitudinal direction of the forming tool. Irregular material ply contours can also be handled, different lateral positions can also be set at different points of the movement route.

It is preferable for the material ply positioning unit to comprise at least one first actuator for moving at least one first engaging unit of the material ply positioning unit into a first lateral position dependent on the current route position and at least one second actuator for moving at least one second engaging unit of the material ply positioning unit into a second lateral position dependent on the current route position. Thus, for example, a stop or another engaging unit on one side and a stop or another engaging unit on the other side may be modulated differently. Different positions for the lateral edges of the material ply can thus be set. A material ply having irregular width or having irregular contours can thus be positioned.

It is preferable for the material ply positioning unit to comprise at least one stop for engaging on a lateral edge of the material ply.

It is preferable for the material ply positioning unit to comprise at least one stepping motor or servomotor having position detection for modulating the position of the material ply dependent on the current route position. This is a preferred embodiment for the above-mentioned actuator.

It is preferable for the material ply positioning unit to comprise a material ply width detection unit for detecting a width of the material ply at the current route position. The current width of the material ply at this route position can also be measured simultaneously with the positioning.

It is preferable for the material ply positioning unit to comprise a material ply positioning controller, which is designed to determine the lateral position of the material ply dependent on the current route position from predetermined data and to control the lateral positioning accordingly. This material ply positioning controller can also be designed as an NC-controller. For example, the target position of the first and the second lateral edge at the predetermined position can be specified in the longitudinal direction of the forming tool (example of the movement route) by CAD data and set on the material ply by the material ply positioning unit.

The positioning device preferably comprises at least one slide rail or one or more rollers on the upper side of the positioning device to facilitate a relative movement between the material ply and the positioning device during the movement of the positioning device on the movement route between material ply and forming tool. The material ply can thus be guided easily over the upper side of the positioning device and can be deposited behind the carriage easily on the forming tool in exact lateral position.

The positioning device preferably comprises at least one pressing roller for pressing the material ply onto the forming tool. The pressing roller can be guided, for example, behind the carriage, for example, on a cantilever arm, to press the material ply laterally positioned by the carriage onto the forming tool.

The positioning device preferably comprises a temperature control unit or heating unit for the temperature control of the material ply for the pressing on or during the pressing onto the forming tool. In particular, the pressing roller can be heated to improve the adhesion of a laminate used as a material ply onto the forming tool (or onto material plies previously laid thereon).

According to a further aspect, the invention provides a forming arrangement for forming a preform of a reinforcing element made of fiber composite material, comprising a forming tool and a positioning device according to one of the above designs.

It is preferable for the forming tool to extend longitudinally in a longitudinal direction, wherein the movement route extends along the longitudinal direction.

It is preferable for the forming tool to comprise a forming surface having a trapezoidal cross-sectional contour.

It is preferable for the forming tool to comprise a varying width along a longitudinal direction.

It is preferable for the forming tool to comprise a forming surface symmetrical in relation to a longitudinal center plane of the forming tool, wherein the movement route extends along the longitudinal center plane in the longitudinal direction.

It is preferable for the forming arrangement to comprise a reference mark and/or a reference point for the detection of the route position. A reference mark is preferably provided on the forming tool.

It is preferable for the reference mark to be embodied as a marking which can be optically detected. The positioning device preferably comprises an optical detection unit for detecting the optical marking. The detection unit is preferably designed as an optical measuring unit for determining the position of the positioning device on the basis of the reference mark.

It is preferable for the reference mark to comprise additional optically detectable items of information. The reference mark preferably comprises additional items of control information. The reference mark preferably comprises an optically detectable and/or machine-readable code, for example, a barcode or QR code. The forming arrangement preferably comprises a corresponding code reader. This can be embodied separately, for example, on a mobile user terminal, for example, a smart phone, which is connected to a controller of the positioning device or the forming arrangement. Alternatively or additionally, it is provided that the optical detection unit is designed for reading out the optically detectable information.

According to a further aspect, the invention provides a positioning method for positioning a material ply on a forming tool for producing a preform for a fiber composite component having the following steps:

laying the material ply on the forming tool, positioning a positioning device in relation to a surface of the forming tool, moving the positioning device between material ply and forming tool along a predetermined movement route over the forming tool, detecting the current route position of the positioning device on the movement route, laterally positioning the material ply on the forming tool at the current route position, wherein the lateral position is determined in dependence on the current route position on the basis of predetermined data.

The positioning method preferably comprises:

using a positioning device according to one of the preceding designs and/or a forming arrangement according to one of the preceding designs.

According to a further aspect, the invention provides a computer program product comprising machine-readable control instructions which, when they are loaded into a controller of a positioning device of a forming arrangement according to one of the preceding embodiments, cause the positioning device to carry out the positioning method of one of the preceding designs.

According to a further aspect, the invention provides a method for producing a preform for a reinforcing element formed from fiber composite material for a part of an air vehicle, comprising positioning at least one material ply of the preform on a forming tool using the positioning method according to one of the preceding designs.

It is preferable for a fiber ply and/or a laminate to be positioned on the forming tool as the material ply.

Advantageous designs of the invention are usable in the production of composite material reinforcing elements, in particular stringers and frames, more particularly panels for aircraft, in particular for control surfaces, for example, landing flaps, of aircraft. A positioning of laminates on forming tools is particularly preferably performed to adapt the location of the laminate to a design close to the final contour of cavities in webs of stringers.

Particularly preferred designs of the invention have the advantage that lateral positioning of laminates on oblong forming tools may be achieved in a continuous method.

Particularly preferred designs of the invention have the advantage that a planar fixation in an exact lateral location is achievable.

Particularly preferred designs of the invention have the advantage that lateral positioning may also be achieved of material plies having lesser lateral rigidity, for example, as in the case of not yet cured fiber composite laminates.

Particularly preferred designs of the invention have the advantage that lateral positioning of material plies, even having irregular shapes, may be achieved without forming waves or folds in the material ply.

Particularly preferred designs of the invention provide a positioning device which moves along the longitudinal direction of the forming tool and moves a stop on each side to the desired position, in order to provide a movable stop, which continuously places the material ply, for example, a laminate made of fiber plies or made of fiber composite material, in the desired position.

The movement of the positioning device can be performed either manually or automatically, wherein it is ensured in both cases that the correct lateral position matches with the presently provided position in the longitudinal direction.

According to one preferred embodiment of the invention, a positioning device is proposed, which can be moved on the forming tool and comprises a first and a second lateral stop, which are each NC-controlled, as a material ply engaging unit and edge engaging unit.

The movement of the positioning device can occur manually, wherein the positioning device measures the current position. According to another design, the movement of the positioning device can occur in a driven manner, for example, driven by a motor.

While the positioning device is moved on the upper side of the forming tool, the material ply, for example, the laminate, is guided via the shape of the positioning device. This raising permits easier lateral movement of the material ply, which can adhere to the forming tool, for example, in cases in which a pull-off film is not provided on the lower side of a laminate.

One design of the positioning device comprises a pressure arm having a pressing roller, using which, depending on the positioning and deposit of the material ply, it can be pressed firmly onto the forming tool (including possible plies already located thereon). If a heating unit is added to the pressing roller, this can result in a further increase of the adhesion of the material ply, which is formed as a laminate, for example, and thus replace further fixing aids.

The forming tool can have a form, for example, to form oblong channeled reinforcing profiles, which protrudes from a base and the surfaces of which do not extend in parallel to one another. The surfaces can extend linearly, for example. For example, a form having trapezoidal cross section is provided, the width and/or height of which changes continuously along the longitudinal extension. For example, the forming tool can taper continuously toward one longitudinal end. In particular for such a shape of a forming tool having form protruding from a base in a nonparallel but linearly extending manner, one preferred design of the positioning device is provided with a synchronized centering unit, to achieve the correct positioning of the positioning device in relation to a reference plane of the forming tool (for example, the longitudinal center plane). This can be achieved, for example, by a spring-loaded parallelogram and clamping rollers on the lower base of the forming tool. For a more complex or irregular base form geometry, an additional NC-controller of the positioning unit can be provided for positioning the positioning device on the forming tool.

An alternative approach permits the mechanically simpler non-centered placement on a reference side, while the forming tool width and the correction are computed from the measured position. This can be performed as a result of the initial NC programming. This approach is mechanically simpler, but can introduce a further source of errors under certain circumstances.

If the worktable used (having the forming tool) enables the integration of rails and, for example, a gearwheel guide or another accurately-positioned drive system, the reference for the positioning can be produced from the external source. The tool can be placed floating on the table.

An in-line position measurement (without external connection) can be achieved by odometry, optical measurement, or an external reference. Since the position information (exact position on the movement route) is critical for system tolerances, a simple detection via the drive (for example, via the controller of the movement drive motor) is not preferred. An additional measurement on an unloaded freewheeling friction wheel is preferred to correct the current position and minimize slip effects.

In addition, the width of the material ply, for example, laminate, can be measured during the positioning method, to check whether the tolerances of the material ply are within the correct limits. This can be performed, for example, by means of an edge sensor attached to the lateral stops.

Depending on the required overall positioning tolerance, it is preferable to provide an additional spacing on each side for the lateral positioning pins. An alternative to this approach is the definition of a reference sign without specifying a spacing and a force-limited second stop, which presses against the reference side. This approach is limited by the low bending rigidity of the uncured laminate. Because of this, it is advantageous to limit the force imposition on one edge to a minimum.

For the lateral positioning, depending on the requirements for the position tolerances, for example, stepping motors or servomotors having position detection can be used as actuators. In the case of a very narrow tolerance, the use of servomotors is preferred to compensate for the errors introduced by the positioning force and microstep inaccuracies.

The force required for the positioning may be reduced in that the material ply is moved over the positioning device using slide rails or using rollers and is not fastened to the tool by the material adhesion, which is the normal case in manual positioning and complicates the accurate positioning, since initially the material adhesion has to be overcome first and thereupon results in excessive movements.

For the NC programming of the guide position, the upper side curvature of the forming tool is also to be taken into consideration. In one design, the angle of the surface of the forming tool at the current position can therefore also be taken into consideration based on the current alignment of the positioning device. The normal case in the event of parallel clamping is 90° in relation to the side if the curvature of the upper side of the forming tool is ignored.

BRIEF DESCRIPTION OF THE DRAWINGS

The invention is explained in greater detail hereafter on the basis of the appended drawings. In the figures.

DETAILED DESCRIPTION OF THE PREFERRED EMBODIMENTS

Figure 1:
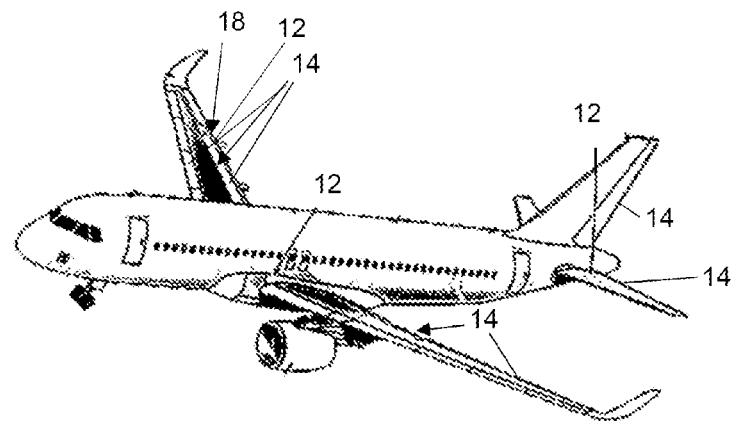
FIG. 1 shows a perspective schematic view of an air vehicle in the form of an aircraft having different examples for components made of fiber composite materials.

FIG. 1 shows an aircraft 10 as an example of an air vehicle, which comprises different components 12 made of fiber composite material. In particular, control surface elements 14, for example, outboard landing flaps 16, are formed from a fiber composite material, such as carbon-fiber-reinforced plastic material (CFRP), in particular.

Figures 2, 3:
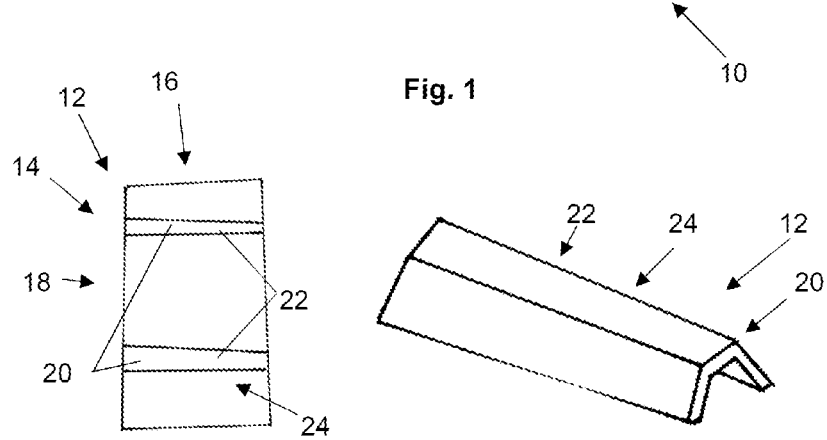
FIG. 2 shows a bottom view of a panel of a control surface of the air vehicle from FIG. 1 having reinforcing elements embodied as stringers as a further example of a component made of fiber composite materials.
FIG. 3 shows a schematic perspective view of an example of a stringer for the panel of FIG. 2, as a further example of a component made of fiber composite material.

FIG. 2 shows a lower side of a panel 18 for the outboard landing flaps 16 having reinforcing elements 20 in the form of stringers 22. A schematic perspective view of such a stringer 22 is illustrated in FIG. 3.

Since the panels 18 of the outboard landing flaps 16 are to have predetermined curvatures and are to have defined degrees of rigidity, the stringers 22 are adapted with regard to the shape thereof. The stringers 22 comprise, for example, of reinforcing profiles 24 made of the fiber composite material, the profile of which is formed T-shaped, L-shaped, or U-shaped as shown. The width of the stringer 22 is embodied differently along its longitudinal extension. The stringers 22 can also extend in a curve.

Figure 4:
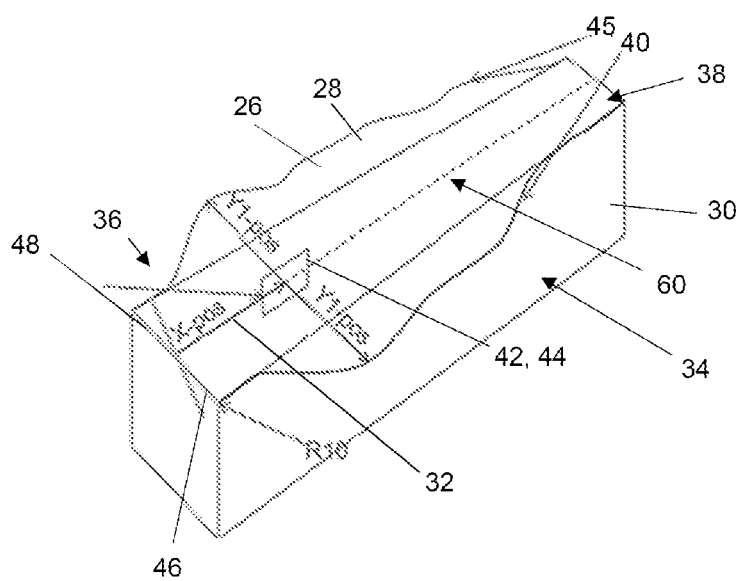
FIG. 4 shows a step during positioning of a material ply on a forming tool in the course of the production of a stringer according to FIG. 3.

To produce the stringers 22, a procedure which is fundamentally known for such fiber composite materials is used in that, as shown in FIG. 4, material plies 26 in the form of laminates 28 made of fiber plies having binder material or formed on a forming tool 30 to form a preform (not shown) for the stringer 22, from which the component 12 made of fiber composite material, i.e., for example, the stringer 22 is then formed by infiltration with further binder material and/or curing of the laminates 28 laid one on top of another.

In the stringers 22 shown, the forming tool 30 has a forming surface shaped in accordance with the inner contour of the stringers 22. In accordance with the changing width along the longitudinal extension of the stringer 22, the forming tool 30 is not equal in width along its longitudinal direction 32, but rather is formed conically tapering having width becoming gradually less. A first side 34 of the forming tool 30 and the second side 36 of the forming tool are thus not parallel to one another.

The entire upper side 38 of the forming tool 30 is to be covered by the laminate 28, which is initially flat and is then to be formed on the forming tool 30.

As shown in FIG. 3, the laminate 28 is not provided with continuously equal width, but rather can have a width dependent on the position along the longitudinal direction 32 of the forming tool 30, so that a first lateral edge 40 of the laminate at the x position x has a lateral position Y1 from the longitudinal center plane 44 used here as the reference plane 42. The second lateral edge 45 accordingly has a position Y1 on the other side of the reference plane 42. The respective y position is dependent on the x position and can be predetermined by CAD data.

For the exact production of the stringer 22 having predetermined force profiles—for example, having a structure of cavities close to the final contour—it is desirable to position the material ply 26 very exactly on the forming tool 30.

A positioning in the x direction—i.e., the longitudinal direction 32 of the forming tool 30—can be performed by applying an end edge 46 to an end stop 48 provided on the forming tool 30.

However, the exact lateral positioning of the material ply 26 along the reference plane 42 in the longitudinal direction 32 is difficult.

Figure 5:
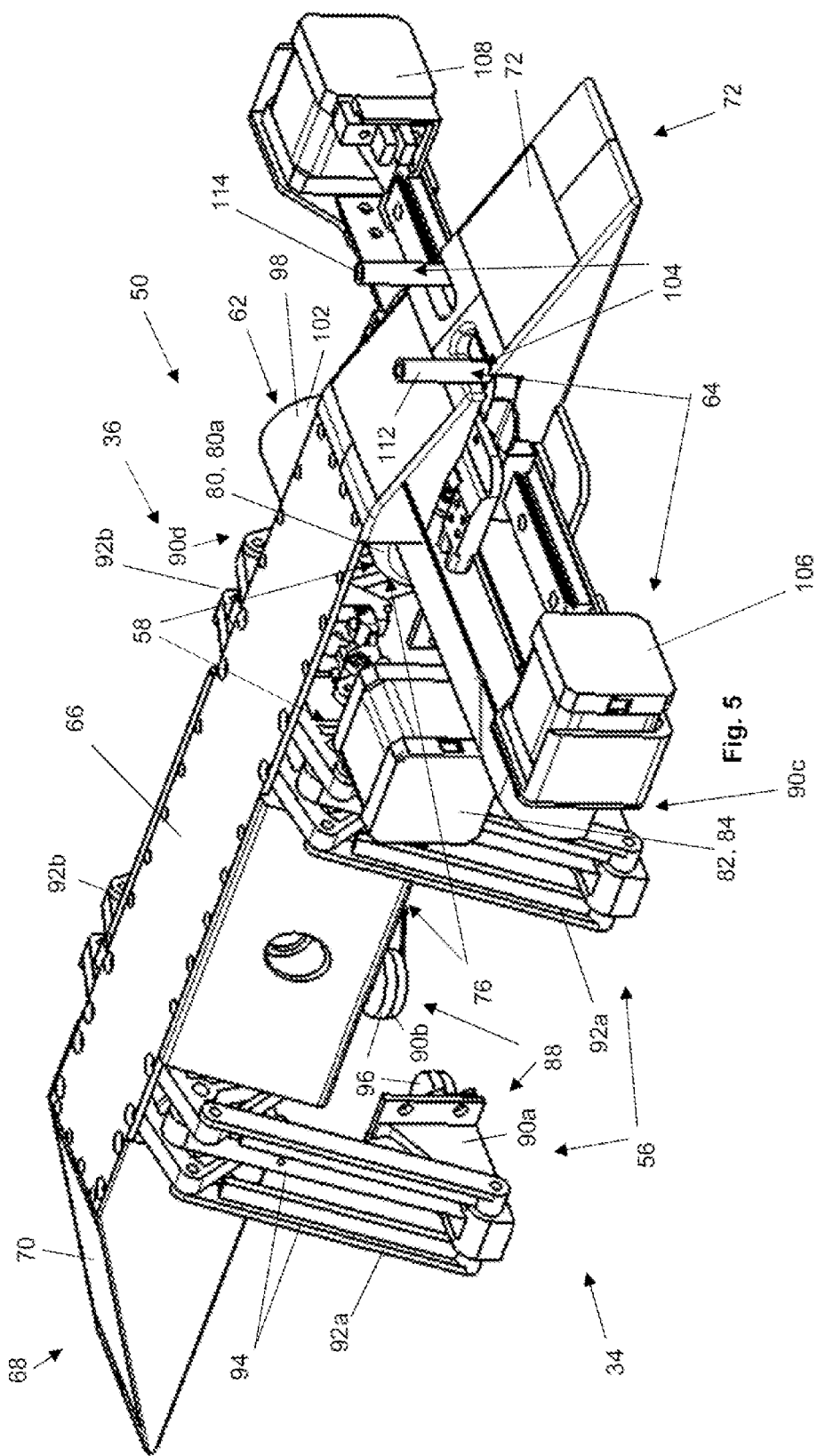
FIG. 5 shows a perspective view of an embodiment of a positioning device for positioning the material ply of FIG. 4 on the forming tool.
Figure 6:
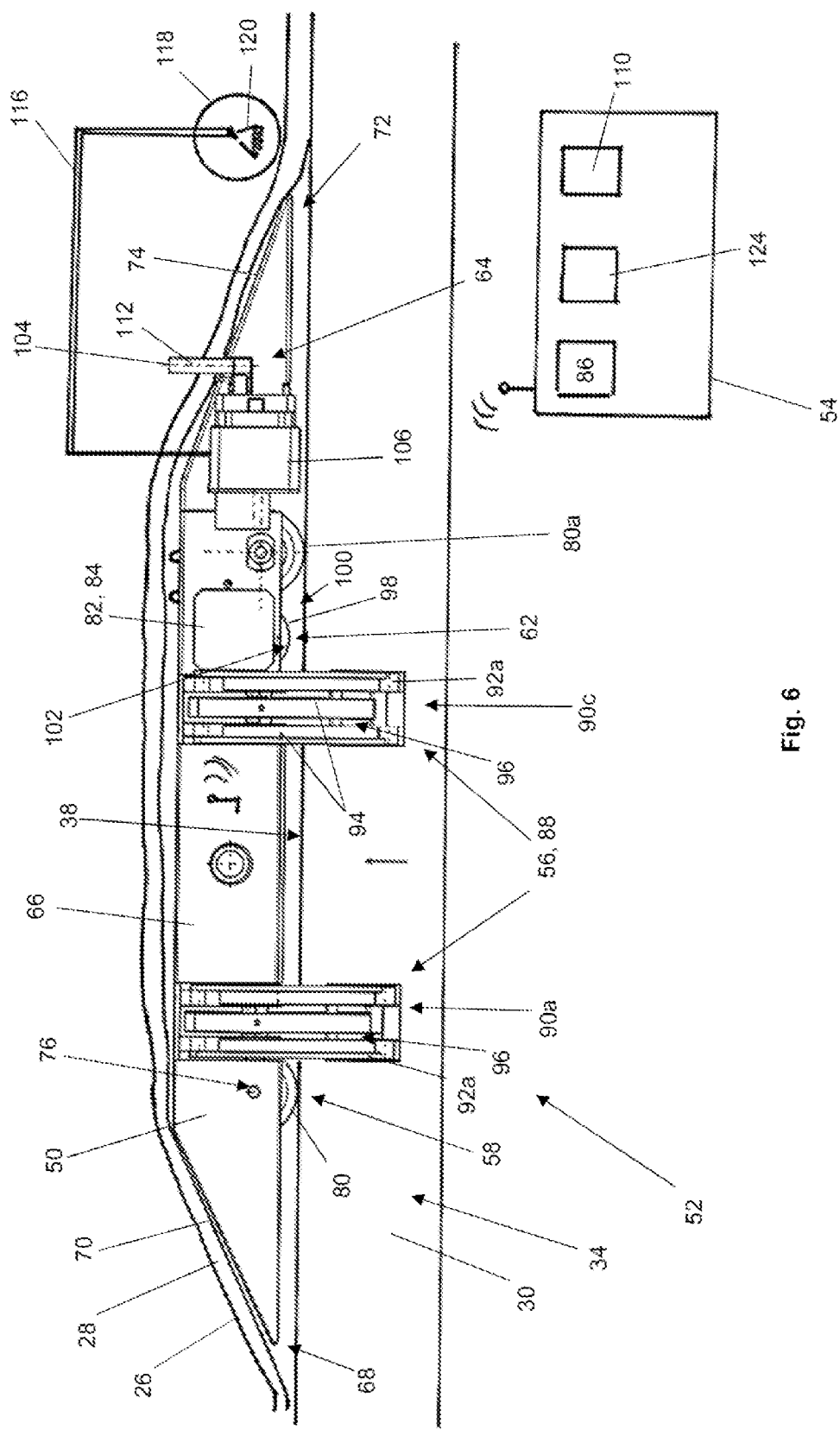
FIG. 6 shows a side view of a forming arrangement for producing a preform for the fiber composite component according to FIG. 3 during the positioning of the material ply shown in FIG. 4 on the forming tool.

A positioning device 50 is provided for the exact positioning, which is shown in a first embodiment in a perspective view in FIG. 5 and during use in a forming arrangement 52 during the positioning of the material ply 26 in a side view in FIG. 6.

The forming arrangement 52 comprises the forming tool 30 and the positioning device 50. A controller 54 of the positioning device is also indicated in FIG. 6. The controller 54 is communicatively connected in some manner, for example, by radio, to sensors and actuators of the positioning device.

As is apparent from FIGS. 5 and 6, the positioning device 50 comprises a positioning unit 56 for positioning the positioning device 50 in relation to the lateral surfaces—for example, the surfaces on the sides 34, 36—of the forming tool 30, a movement unit 58 for moving the positioning device 50 along a predetermined movement route 60, which extends in the example illustrated here along the longitudinal center plane 44, a route position detection unit 62 for detecting the present route position of the positioning device 50 on the movement route 60, and a material ply positioning unit 64 for positioning the material ply 26 in a direction transverse in relation to the movement direction, wherein the positioning takes place in dependence on the current route position.

The positioning device 50 comprises a carriage 66 movable on the forming tool 30, which is provided at a front end 68 with a front ramp 70 and at a rear end 72 with a rear ramp 74.

The movement unit 58 comprises a chassis 76 on the carriage 66 having multiple rollers or wheels 80, at least one of which forms a drive wheel 80a, which is driven by a movement drive motor 82 in the form of a first stepping motor or servomotor. The movement drive motor 82 is modulated by a movement controller 86 implemented in the controller 54.

The positioning unit 56 is formed to enclose the convex forming surface of the forming tool 30 and comprises a centering unit 88, using which the positioning device 50 can be centered in relation to the longitudinal center plane 44.

The centering unit 88 comprises a first to fourth contact element 90a-90d for contacting spaced-apart points on the first side 34 of the forming tool 30 and on the opposing second side 36 of the forming tool 30. The contact elements 90a-90d are movable in the direction transverse to the movement direction 32 toward the forming tool 30 and away from it, to thus adapt themselves to the course of the surfaces, which changes in relation to the longitudinal center plane 44, on the first side 34 and the second side 36.

In the illustrated exemplary embodiment, the contact elements are arranged on two spaced-apart first positioning arms 92a on the first side 34 of the positioning device 50 and two second positioning arms 92b spaced apart from one another on the second side 36 of the positioning device 50.

The positioning arms 92a, 92b each comprise a parallelogram guide 94, wherein the respective opposing first and second positioning arms 92a, 92b are movement-coupled to one another and are elastically pre-tensioned toward one another by a spring (not shown in greater detail here) or another force accumulator. Clamping rollers 96 are provided as contact elements 90a-90d. In the embodiment shown, a clamping roller 96 is provided on each end of a positioning arm 92a, 92b. In another embodiment (not shown in greater detail here), two clamping rollers 96 spaced apart from one another in the vertical direction are provided per positioning arm 92a, 92b. The clamping rollers 96 are clamped on the first side 34 and the second side 36 of the forming tool 30 by the springs, whereby the positioning device 50 mechanically positions itself on the longitudinal center plane 44.

The route position detection device 62 comprises an odometer 98 having a freewheeling friction roller 100, the rotational angle of which is detected by an incremental encoder 102. In this case, the revolutions and the rotational angle are detected during a movement of the positioning device 50 over the movement route proceeding from a route mark, for example, the end stop 48. In another embodiment, an absolute value encoder is provided instead of an incremental encoder 102. In still another embodiment, an optical measuring unit (not shown) is provided for measuring the position of the positioning device 50 in relation to an outer reference point. If the outer reference point is embodied as an optically detectable marking on the forming tool, it can contain additional items of control information for the sequence controller, for example, selection of the correct NC program associated with the forming tool.

The material ply positioning unit 64 comprises multiple material ply engaging units 104 for engaging and laterally moving the material ply 26, which are laterally movable using actuators in the form of a second servomotor 106 and a third servomotor 108. The second and third servomotors 106, 108 are each provided with a position detection unit, which relays a position of the material ply engaging units 104 to the controller. The controller 54 comprises a material ply positioning controller 110, in which the target position Y for the first and second lateral edge 40, 45 at every x position along the movement route 60, i.e., along the longitudinal center plane 44, are stored. The position of the material ply engaging units 104 is modulated accordingly via the servomotors 106, 108. A spacing can be added for this purpose depending on the predetermined tolerance for the positioning.

The respective material ply engaging unit 104 is designed as an edge engaging unit for engaging on the associated lateral edge 40, 45. For this purpose, a material ply engaging unit 104 comprises a first stop 112 for engaging on the first lateral edge 40 and another second stop 114 for engaging on the second lateral edge 45. The stops 112, 114 are activatable separately via the servomotors 106, 108, so that intentionally asymmetrical positions of the lateral edges 40, 45 at current x positions along the movement route are also achievable.

FIG. 6 shows the method of positioning the material ply 26 on the forming tool 30.

For this purpose, the positioning device 50 is moved by means of the movement unit 58 over the forming tool 30. The route position detection unit 62 detects the present x position of the positioning device 50 in this case. The material ply positioning unit 64 sets the location of the first stop 112 and the second stop 114 in dependence on this x position to thus position the material ply 26.

As is apparent from FIG. 6, the positioning device 50 moves in this case with the front ramp 70 between the material ply 26 and the forming tool 30, so that the material ply 26 is guided over the upper side of the carriage 66, is laterally positioned at the stops 112, 114, and is deposited via the rear ramp 74 on the eforming tool 30.

The positioning device 50 furthermore comprises, for example, fastened via a cantilever arm 116, a pressing roller 118 for pressing on the material ply 26 in the movement direction behind the carriage 66. The pressing roller 118 is heated by a temperature control unit in the form of a heating unit 120.

Instead of the solely mechanical positioning of the positioning device 50 on the forming tool 30 shown here, a servo controller can also produce the location of the contact elements 90a-90d, for example, via actuators (not shown in greater detail). The controller 54 can then also comprise a position controller 124 for controlling these actuators, which actively move the positioning arms 92a, 92b, for example.

In another design, the movement unit 58 can solely comprise a freely rotating chassis 76 without drive wheel 80a and without movement drive motor 82 or also only a sliding surface on the lower side of the carriage 66, wherein the movement is performed manually by personnel and in this case the route/the portion covered is detected by the route position detection unit 62.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS 10 aircraft
12 component
14 control surface element
16 outboard landing flap
18 panel
20 reinforcing element
22 stringer
24 reinforcing profile
26 material ply
28 laminate
30 forming tool
32 longitudinal direction
34 first side
36 second side
38 upper side
40 first lateral edge
42 reference plane
44 longitudinal center plane
45 second lateral edge
46 end edge
48 end stop
50 positioning device
52 forming arrangement
54 controller
56 positioning unit
58 movement unit
60 movement route
62 route position detection unit
64 material ply positioning unit
66 carriage
68 front end
70 front ramp
72 rear end
74 rear ramp
76 chassis
80 wheels
80a drive wheel
82 movement drive motor
84 first servomotor
86 movement controller
88 centering unit
90a first contact element
90b second contact element
90c third contact element
90d fourth contact element
92a first positioning arm
92b second positioning arm
94 parallelogram guide
96 clamping roller
98 odometer
100 friction roller
102 incremental encoder
104 material ply engaging unit
106 second servomotor
108 third servomotor
110 material ply position controller
112 first stop
114 second stop
116 cantilever arm
118 pressing roller
120 heating unit
124 position controller

The invention claimed is:
1. A positioning device for positioning a material ply on a forming tool during a production of a fiber composite component, comprising:
a positioning unit configured to position the positioning device in relation to a surface of the forming tool, a movement unit configured to move the positioning device along a predetermined movement route along the forming tool, a route position detection unit configured to detect a current route position of the positioning device on the movement route, and a material ply positioning unit configured to position the material ply in a direction transverse to a movement direction in dependence on the current route position detected by the route position detection unit, wherein the positioning device is positioned between the forming tool and material ply and is configured to move the material ply relative to the forming tool.

2. The positioning device as claimed in claim 1, further comprising a carriage movable over the forming tool.

3. The positioning device as claimed in claim 2, wherein the carriage comprises at least one ramp at at least one of a front or rear end with respect to the movement direction, to guide the material ply over the carriage or from the upper side of the carriage to the forming tool.

4. The positioning device as claimed in claim 1, wherein the positioning unit at least one of:
is configured to enclose a convex forming surface of the forming tool;
comprises a centering unit configured to center the positioning device on an oblong forming tool;
comprises at least one first positioning arm configured to detect a first side of the forming tool and at least one second positioning arm to detect a second side of the forming tool opposite to the first side;
comprises positioning arms which are movement-coupled to one another to detect the forming tool;
comprises multiple positioning arms spaced apart in the movement direction;
comprises multiple contact elements configured to contact different points on an outer surface of the forming tool,
comprises a spring-loaded or elastically pre-tensioned parallelogram guide;
comprises multiple clamping rollers configured to clamp onto the forming tool; or
comprises a positioning controller for computer-based positioning of the positioning device.

5. The positioning device as claimed in claim 1, wherein the movement unit at least one of:
comprises at least one drive roller or one drive wheel;
comprises at least one movement drive motor;
comprises at least one stepping motor or servomotor having position detection; or
comprises at least one movement controller.

6. The positioning device as claimed in claim 1, wherein the route position detection unit at least one of:
comprises an odometer or distance odometer;
comprises an optical length measuring device or position detection device;
comprises a rotational angle encoder or rotational speed encoder on a roller or wheel rolling on the movement route;
comprises a rotational angle encoder or rotational speed encoder on a movement drive motor or a gearing element connected thereto for joint rotation;
is connected to a movement controller or a signal encoder for modulating a movement drive motor to obtain an item of information about the route position;
comprises a relative value encoder and a reference point; or
comprises an absolute value encoder.

7. The positioning device as claimed in claim 1, wherein the material ply positioning unit at least one of:
comprises at least one material ply engaging unit configured to engage on the material ply;
comprises at least one of at least one first edge engaging unit configured to engage on a first lateral edge of the material ply or one second edge engaging unit for engaging on a second lateral edge of the material ply opposite to the first lateral edge;
comprises at least one actuator configured to laterally move at least one engaging unit of the material ply positioning unit into a lateral position dependent on the current route position;
comprises at least one first actuator configured to move at least one first engaging unit of the material ply positioning unit into a first lateral position dependent on the current route position and at least one second actuator configured to move at least one second engaging unit of the material ply positioning unit into a second lateral position dependent on the current route position;
comprises at least one stop configured to engage on a lateral edge of the material ply;
comprises at least one stepping motor or servomotor having position detection configured to modulate the position of the material ply dependent on the current route position;
comprises a material ply width detection unit configured to detect a width of the material ply at the current route position; or
comprises a material ply position controller, which is configured to determine the lateral position of the material ply dependent on the current route position from predetermined data and to control the lateral positioning accordingly.

8. The positioning device as claimed in claim 1, comprising at least one of:
at least one slide rail or one or more rollers on the upper side of the positioning device to facilitate a relative movement between the material ply and the positioning device during the movement of the positioning device on the movement route between material ply and forming tool;
at least one pressing roller configured to press the material ply onto the forming tool; or
a temperature control unit or heating unit to control a temperature of the material ply for the or during the pressing onto the forming tool.

9. A forming arrangement to form a pre-form of a reinforcing element made of fiber composite material, comprising a forming tool and a positioning device as claimed in claim 1.

10. The forming arrangement as claimed in claim 9, wherein the forming tool at least one of:
extends longitudinally in a longitudinal direction, wherein the movement route extends along the longitudinal direction;
comprises a forming surface having a trapezoidal cross-sectional contour;
has a varying width along a longitudinal direction;
comprises a forming surface symmetrical to a longitudinal center plane of the forming tool, wherein the movement route extends along the longitudinal center plane in the longitudinal direction;
comprises a reference mark for a route marking as a reference position for the movement route; or comprises a reference mark which is embodied as an optically detectable marking and additionally contains items of control information for a sequence controller.

* * * * *